Oct. 27, 1964    R. L. UNDERWOOD ETAL    3,154,166
SAFETY DEVICE FOR AIRPLANE LOADING TRUCKS
Filed Nov. 26, 1962    2 Sheets-Sheet 1
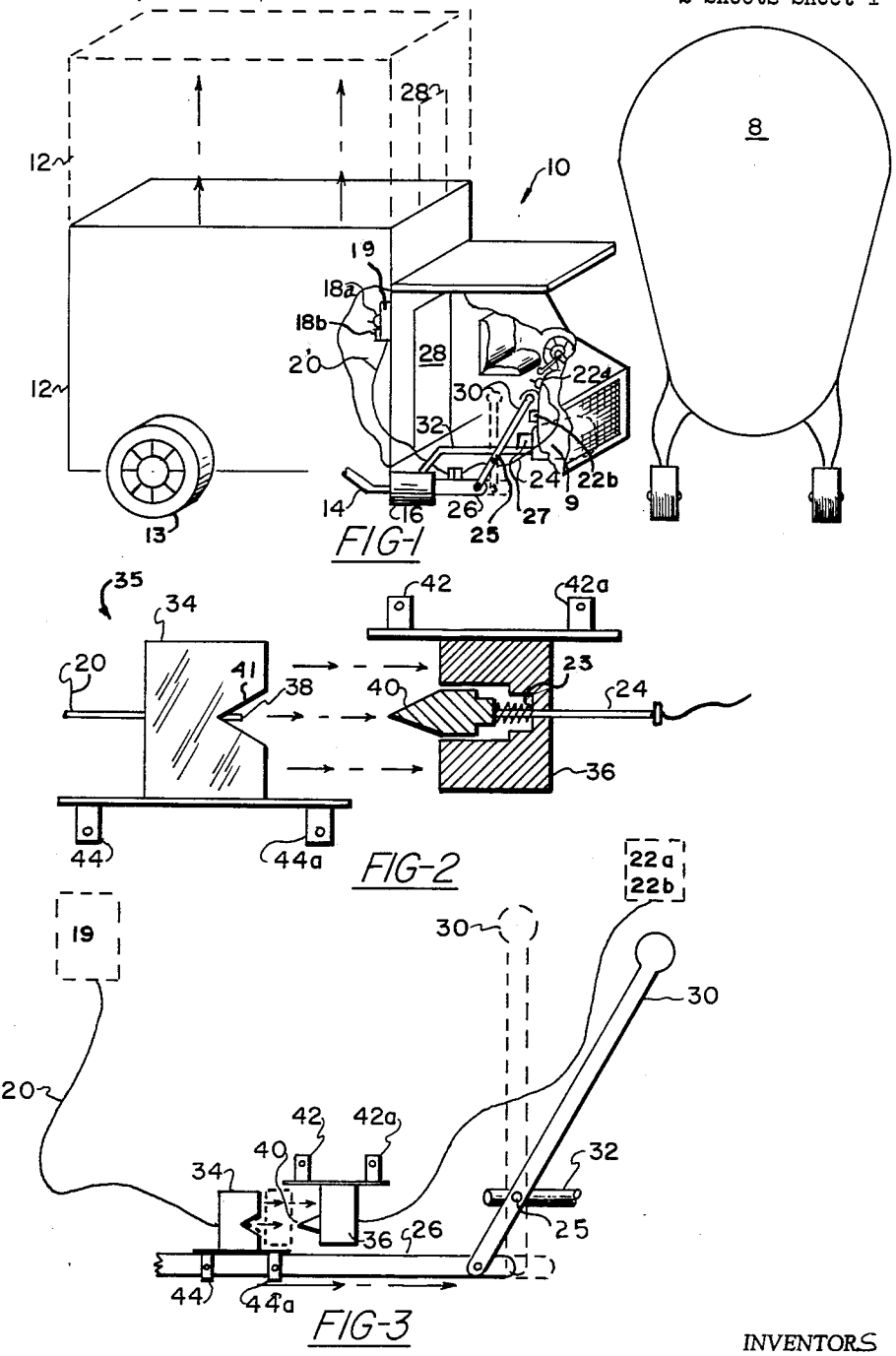
INVENTORS
RAYMOND LEROY
  UNDERWOOD
JOHN CUPOLO
by Jacob L. Kollin
    ATTORNEY

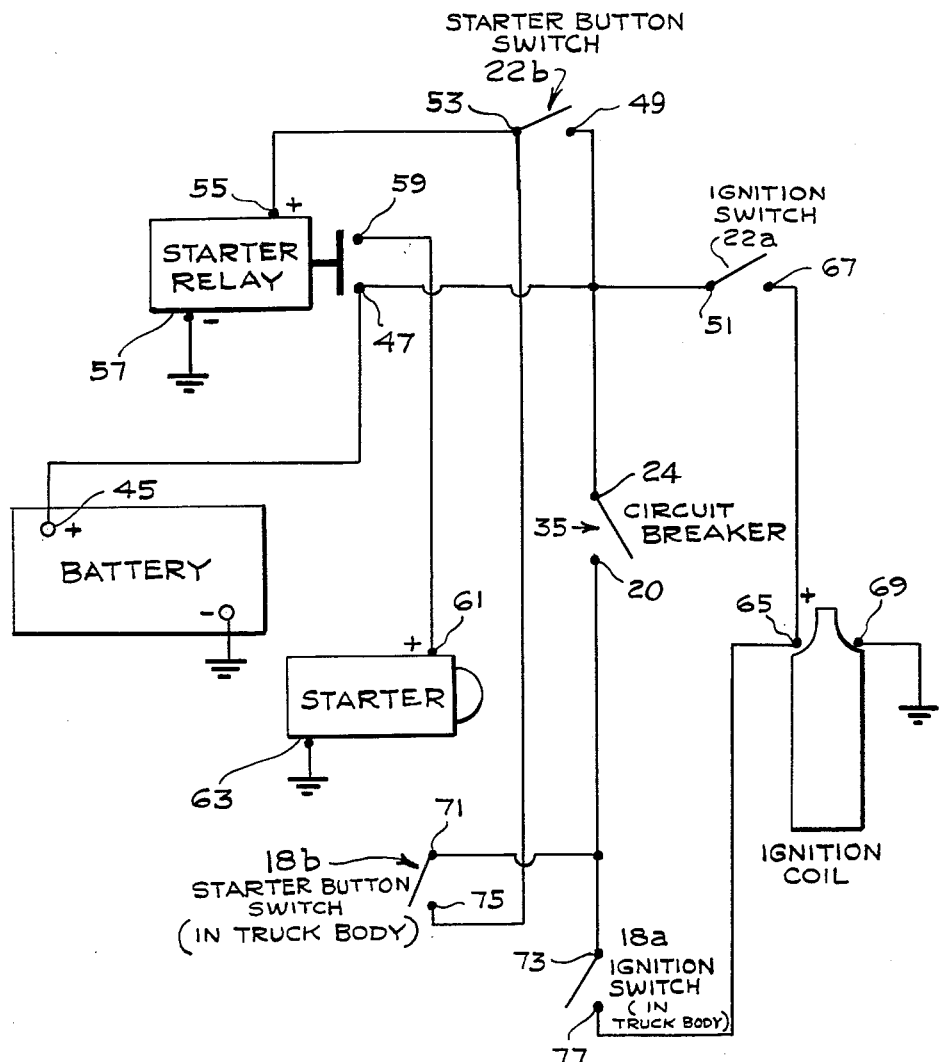

United States Patent Office 3,154,166
Patented Oct. 27, 1964

3,154,166
SAFETY DEVICE FOR AIRPLANE
LOADING TRUCKS
Raymond Leroy Underwood, 20—09 Shore Blvd., and John Cupolo, 3090 14th St., both of Astoria, N.Y.
Filed Nov. 26, 1962, Ser. No. 239,927
3 Claims. (Cl. 180—82)

The invention relates to motor vehicle safety devices in general and in particular to a safety device for a delivery and supply truck provided with a vertically displaceable body for supplying aircraft with food and other supplies.

In contemporary commercial aircraft, loading doors and hatches are disposed at a considerable height above the ground. It is therefore necessary to elevate the truck body to this height to enable a convenient and efficient loading of the aircraft.

Accordingly, aircraft supply trucks are provided with vertically displaceable bodies, which can be raised to the desired height by a mechanism powered by the truck's engine. A control lever mounted in the truck's cab is provided for engaging the mechanism with the engine and for simultaneously disengaging the engine from the truck's drive wheels.

In addition to the usual dashboard starter and ignition switch, another starter and ignition switch is further provided in the truck body interior for starting and running the truck engine and for operating the lift mechanism, after the latter has been engaged by means of the control lever, with the truck's engine.

It frequently happens that the operator of the truck forgets to pull the lever and disengage the engine from the drive wheels before attempting to operate the truck body lift mechanism from the interior of the body. Since the drive wheels remain engaged with the truck's engine, the truck is propelled toward the aircraft, resulting in a collision with the latter and in considerable damage and costly delay in the flying schedule.

It is therefore an important object of the invention to overcome this disadvantage by providing a safety device which will prevent such collisions, the damage and time loss resulting therefrom.

Other objects and a fuller understanding of the invention may be had by referring to the following description and claims taken in conjunction with the accompanying drawing.

It should be understood, however, that these are given by way of illustration and not of limitation, and that various changes in the details, form and arrangement of the parts may be made without departing from the scope of the invention.

In the drawing:

FIG. 1 is a schematic view, partly in section, of the truck incorporating the safety device alongside an aircraft about to be loaded, FIG. 2 is an elevational view, partly in section of the safety device, FIG. 3 is an elevational view of the device and the mechanism for operating the former, and FIG. 4 illustrates the circuit arrangement of the device.

Referring now to the drawing in detail there is shown alongside the aircraft 8 a delivery truck 10, equipped with a vertically displaceable body 12 which may be elevated by a partially shown linkage 14 of a hydraulic cylinder 16 when the control lever 30 is shifted into the position shown in dotted lines.

The lever 30 is connected in known manner to a clutch mechanism (not shown) for engaging the motor 9, shown in dotted lines with the vehicle's drive wheels 13, so that in the lever's forward position, shown in solid lines in FIGS. 1 and 3, the drive wheels are operably engaged with the motor 9. Lever 30 is pivoted at 25 to a chassis portion (not shown) and secured to rod 26, the latter serving to open the inlet port (not shown) of the hydraulic cylinder 16, supplied with pressure medium from a pump 27 by the motor 9 when the lever is in the position shown by dotted lines in FIGS. 1 and 3.

An electrical system which makes possible the safe operation of the vehicle is arranged as follows:

An ignition switch 18a and a push-button starter switch 18b are mounted on a panel 19 in the truck body 12 and a similar ignition switch 22a and push-button starter switch 22b are mounted on the instrument panel in the truck's cab. The pair of ignition switches and the pair of starter switches are each connected in parallel so that the truck's engine 9 may be started and operated from either the cab or the truck body 12, except that the starting and ignition circuits from ignition switch 22a and push-button starter switch 22b may be opened by the circuit breaker 35 shown in FIG. 2.

The circuit arrangement is shown in FIG. 4. The positive terminal 45 of the battery whose negative terminal is grounded is connected to the relay switch contact 47 to the contact 49 of the push-button switch 22b, contact 51 of ignition switch 22a and terminal 29 of circuit breaker 35. The other contact 53 of switch 22b is connected to one end 55 of the starter relay solenoid, whose other end 57 is grounded. The contact 59 of the relay switch is connected to the positive terminal of the starter at 61, the negative terminal 63 of which is grounded. The positive terminal 65 of the ignition coil's primary winding is connected to the contact 67 of the ignition switch 22a, while its other terminal 69 is grounded.

The push-button starter switch 18b on the panel in the truck body has its contact 71 connected to rod 20 of the circuit breaker 35 by a lead as does the contact 73 of ignition switch 18a. The contact 75 of the push-button starter switch is connected to the positive terminal 55 of the relay solenoid while the contact 77 of ignition switch 18a is connected to the positive terminal 65 of the primary winding of the ignition coil.

The circuit breaker 35 comprises insulating block 34 secured by means of brackets 44, 44a to the rod 26. There is fixedly secured to the truck chassis by means of brackets 42, 42a, an insulating block 36 through which extends a rod 24. One end of the rod 24 is provided with a conical contact 40 adapted to be received in the conical recess 41 of block 34 and to make electrical contact with the contact 38 when block 34 and rod 26 are displaced in the direction of the arrow and control lever 30 is in the position shown in dotted line in FIG. 3. A spring 23 mounted between contact 40 and block 36 assures the former's proper engagement with the contact 38.

Only in this closed position of the circuit breaker can the operator actuate the starting and ignition circuits from the interior of the truck body. Since lever 30 is now in the operating position, the inlet part of the hydraulic power cylinder is open, as already explained above, and the hydraulic pressure fluid actuates the lift mechanism thus elevating the truck body 12 to the position shown in dotted lines in FIG. 1.

On the other hand when the control lever 30 is in the position shown in solid lines in FIGS. 1 and 3, the switch is open, as shown in solid lines in FIGS. 2 and 3, while the truck engine is engaged with the drive wheels. In this position of the lever the truck's engine can not be started by operating the ignition and starter switches 18a, 18b in the interior of the truck body 12, because switch 35 is open.

It will be appreciated that should the operator of the truck forget to move control lever 30 from the position in which it engages the engine with the vehicle's drive wheels (i.e. the position shown in solid lines in FIGS. 1 and 3) and attempt to start the engine from the interior of the truck body by turning on the ignition and starter switches 18a, 18b, the truck engine will not start since the circuit breaker 35 is in open position. A sudden thrust forward by the vehicle towards the aircraft and consequent damage thereto which would result from an ensuing collision is thereby avoided.

The invention having thus been described, what is claimed and desired to be secured by Letters Patent of the United States of America is:

1. In a motor vehicle provided with an automotive engine and a vertically displaceable body, in combination, a hydraulic mechanism for displacing the body, a hydraulic pressure pump operable by said engine, means connecting said pump to said mechanism, a control lever for simultaneously disconnecting the vehicle's drive wheels from said engine and connecting the pump to said mechanism, two pairs of parallely connected starting and ignition switch sets for the engine, and a circuit breaker for disconnecting one of said sets and operable by said control lever, said circuit breaker disengaging said one set when the control lever is in the engine and wheel engaging position.

2. In a motor vehicle provided with an automotive engine for driving the vehicle's wheels, a vertical displaceable body, a mechanism for displacing the body, operable by the engine, in combination, a control lever for simultaneously disconnecting the engine from said wheels and connecting the engine to said mechanism, two pairs of parallely connected starting and ignition switch sets one of which is mounted in said body, and a circuit breaker for disconnecting said one set, said circuit breaker being normally maintained by said lever in an open position when the engine is drivingly connected with the vehicle's wheels.

3. The combination according to claim 2, wherein said circuit breaker comprises a pair of insulating blocks, one of said blocks having a conical recess therein, a fixed contact element in said conical recess, the other of said blocks having a transverse opening therethrough, a movable conical contact element adapted to be received in said conical recess and to contact said fixed element and means biasing said conical contact element into engagement with said fixed element.

References Cited by the Examiner

UNITED STATES PATENTS

| | | | |
|---|---|---|---|
| 2,166,060 | 7/39 | Kirk | 180—82 X |
| 2,797,833 | 7/57 | Cash | 180—82 X |
| 2,929,655 | 3/60 | Hurter | 296—28 |

A. HARRY LEVY, *Primary Examiner.*